(12) United States Patent
Hamada et al.

(10) Patent No.: US 12,470,085 B2
(45) Date of Patent: Nov. 11, 2025

(54) BACKUP POWER SUPPLY

(71) Applicant: Panasonic Energy Co., Ltd., Osaka (JP)

(72) Inventors: Mitsuhiro Hamada, Osaka (JP); Masashi Okumura, Osaka (JP); Naoki Kawai, Hyogo (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 0 days.

(21) Appl. No.: 18/847,707

(22) PCT Filed: Feb. 16, 2023

(86) PCT No.: PCT/JP2023/005588
§ 371 (c)(1),
(2) Date: Sep. 17, 2024

(87) PCT Pub. No.: WO2023/188960
PCT Pub. Date: Oct. 5, 2023

(65) Prior Publication Data
US 2025/0202273 A1    Jun. 19, 2025

(30) Foreign Application Priority Data
Mar. 28, 2022   (JP) .................................. 2022-052518

(51) Int. Cl.
| | |
|---|---|
| H02J 9/06 | (2006.01) |
| H02J 7/00 | (2006.01) |
| H02M 1/32 | (2007.01) |
| H02M 3/335 | (2006.01) |

(52) U.S. Cl.
CPC ............ *H02J 9/061* (2013.01); *H02J 7/0047* (2013.01); *H02J 7/005* (2020.01); *H02M 1/32* (2013.01); *H02M 3/33507* (2013.01)

(58) Field of Classification Search
CPC ............................... H02J 7/0047; H02J 7/005
See application file for complete search history.

(56) References Cited

U.S. PATENT DOCUMENTS

| | | |
|---|---|---|
| 2003/0231009 A1 | 12/2003 | Nemoto et al. |
| 2008/0285184 A1 | 11/2008 | Phadke et al. |
| 2021/0021138 A1 | 1/2021 | Yang et al. |

FOREIGN PATENT DOCUMENTS

| | | |
|---|---|---|
| EP | 3598627 | 1/2020 |
| JP | 2019-030195 | 2/2019 |
| JP | 6656501 B | 3/2020 |

(Continued)

OTHER PUBLICATIONS

International Search Report of PCT application No. PCT/JP2023/005588 dated Mar. 28, 2023.

(Continued)

*Primary Examiner* — Daniel Cavallari
(74) *Attorney, Agent, or Firm* — Rimon P.C.

(57) ABSTRACT

A backup power supply includes a battery module including battery cells, a power conversion unit configured to adjust a voltage of an output of the battery module and output the adjusted output to a load, and a health diagnosis circuit for the power conversion unit, the health diagnosis circuit includes a determination circuit configure to diagnose health of the power conversion unit by detecting input power and output power of the power conversion unit and comparing a ratio of the input power and the output power with a threshold.

14 Claims, 2 Drawing Sheets

(56) References Cited

FOREIGN PATENT DOCUMENTS

| | | |
|---|---|---|
| JP | 6678845 B | 4/2020 |
| JP | 6714767 B | 6/2020 |
| WO | 2016/018351 A1 | 2/2016 |

OTHER PUBLICATIONS

The EPC Office Action dated Jun. 2, 2025 for the related European Patent Application No. 23778990.4.

BACKUP POWER SUPPLY

CROSS-REFERENCE TO RELATED APPLICATIONS

This application is a U.S. national stage application of the PCT International Application No. PCT/JP2023/005588 filed on Feb. 16, 2023, which claims the benefit of foreign priority of Japanese patent application No. 2022-052518 filed on Mar. 28, 2022, the contents all of which are incorporated herein by reference.

TECHNICAL FIELD

The present disclosure relates to a backup power supply configured to supply electric power to a load in emergencies, such as a power failure, and especially relates to a backup power supply including a power conversion unit configured to adjust output voltage of a battery module and supply the adjusted power to a load.

BACKGROUND ART

A backup power supply supplies backup power to a load to maintain an operating state thereof, in the state where power supply from a main power source, such as a commercial power source, is interrupted. At the timing when the main power source is shut down, the backup power supply activates a power conversion unit to supply electric power to a load from a charged battery module. Like a server's emergency power supply, high reliability is required for the backup power supply, i.e., the backup power supply, although not being used for outputting electric power constantly, is operated securely and supplies backup power stably, at the timing when power supply from the main power source is interrupted. For instance, the backup power supply is also used in systems for which absolutely continuous operation is required, such as a data center system and a financial payment system. In such a usage environment, high reliability is required.

The system required to continuously operate includes a battery module, serving as a backup power supply, and an engine generator driven by an engine. This configuration maintains the system in an operation state continuously even after the main power source is shut down. This system supplies electric power from the battery module, serving as a backup power supply, immediately after the main power source is shut down. After that, electric power can be supplied from the engine generator, which has been started, to achieve continuous operation. However, immediately after the main power source is shut down, the engine generator hardly supplies backup power to the system. This is because time is needed to start the engine. Since the battery module, serving as a backup power supply, can be switched into an operating state instantaneously, the system can be held in an operation state immediately after the main power source is shut down. This backup power supply can hold the system in an operating state until the battery module is discharged. Accordingly, if the engine generator is started during that time, continuous operation can be achieved.

If the system does not need to continuously operate after the main power source is shut down, an engine generator is not provided, i.e., only a battery module serving as a backup power supply is used. In this system, the battery module serving as a backup power supply is used to hold the system in an operating state during a period of time when the system can be terminated normally after the main power source is shut down.

Any of the above-mentioned backup power supplies needs such reliability that backup power can be supplied securely and stably after the main power source is shut down. To achieve this operation, it is always monitored whether the backup power supply is in a healthy operation continuously. When the health is not likely to be secured, the backup power supply is replaced immediately, thereby providing high reliability.

On the other hand, for a malfunction that significantly affects health of the power conversion unit, a device that monitors a characteristic change at a level of individual components and estimates the life thereof is developed (see PTLs 1 and 2).

PTL 1 discloses a conventional power supply device that determines the life of an IGBT, which is a semiconductor element constituting a bridge circuit of the power conversion unit. This power supply device detects thermal resistance of the IGBT, serving as the semiconductor element. When the detected thermal resistance exceeds a threshold, the power supply device determines that the IGBT reaches the end of its life. PTL 2 discloses the conventional power supply device that determines the life of a capacitor used for a smoothing circuit of a power supply circuit. In this circuit, the capacitor is charged and then, discharged. A voltage change in the capacitor when discharged is used to determine the life.

CITATION LIST

Patent Literature

PTL 1: Japanese Patent No. 6656501
PTL 2: Japanese Patent No. 6678845

SUMMARY OF INVENTION

The conventional power supply devices, mentioned above, can diagnose a failure of a specific component, but can hardly diagnose health of the entire power conversion unit. Although the power conversion unit is constituted by many components, the conventional device specifies a component whose health is diagnosed. Therefore, the conventional device can hardly detect a malfunction caused by a failure of components whose health is not diagnosed. Furthermore, the power supply device, mentioned above, has a complex circuit configuration, although diagnosing health of a specific component. Therefore, a more complex circuit configuration is needed to diagnose health of even more components. Furthermore, to diagnose health of each component, different circuit configurations are needed. This may cause a drawback in which an extremely complex circuit configuration is needed to diagnose health of two or more components constituting the power conversion unit.

A backup power supply in accordance with an aspect of the present disclosure includes a battery module including battery cells, a power conversion unit configured to adjust a voltage of an output of the battery module and output the adjusted output to a load, and a health diagnosis circuit for the power conversion unit. The health diagnosis circuit includes a determination circuit configure to diagnose health of the power conversion unit by detecting input power and output power of the power conversion unit and comparing a ratio of the output power to the input power with a threshold.

The backup power supply mentioned above has an advantage in which a malfunction of the entire power conversion unit is diagnosed with a simple circuit configuration.

DESCRIPTION OF EMBODIMENT

A backup power supply in accordance with an aspect of the present disclosure includes a battery module including battery cells, a power conversion unit configured to adjust a voltage of an output of the battery module and output the adjusted output to a load, and a health diagnosis circuit for the power conversion unit. The health diagnosis circuit includes a determination circuit configure to diagnose health of the power conversion unit by detecting input power and output power of the power conversion unit and comparing a ratio of the output power and the input power with a threshold.

The backup power supply mentioned above compares the ratio of output power to input power of the power conversion unit with the threshold to diagnose the health, thereby having an advantage in which health of the entire power conversion unit is diagnosed with a simple circuit configuration. The input power and the output power can be detected with a simple circuit configuration. This is because input voltage and input current can be detected to obtain the input power, and output voltage and output current can be detected to obtain the output power.

In the backup power supply in accordance with another aspect of the present disclosure, the health diagnosis circuit may further include a timing circuit configured to determine a diagnosis timing of the power conversion unit. The determination circuit may be configured to diagnose the health of the power conversion unit by controlling the power conversion unit to output electric power to the load at the diagnosis timing determined by the timing circuit.

The backup power supply mentioned above has an advantage in which health diagnosis of the power conversion unit can be detected securely. This is because the timing circuit determines a diagnosis timing at which health of the power conversion unit is diagnosed at predetermined time intervals, and the determination circuit controls the power conversion unit to supply electric power to a load at the diagnosis timing, thereby diagnosing health of the power conversion unit based on the ratio of output power to input power. Especially, the timing circuit determines a diagnosis timing, and the determination circuit diagnoses health of the power conversion unit at the diagnosis timing. Therefore, health of the power conversion unit can be diagnosed over a long period of time to enhance reliability of the backup power supply.

In the backup power supply in accordance with still another aspect of the present disclosure, the timing circuit may be configured to determine the diagnosis timing in response to a trigger signal input from an outside of the backup power supply.

In the backup power supply in accordance with still another aspect of the present disclosure, the timing circuit may include a timer configured to determine the diagnosis timing.

In the backup power supply in accordance with still another aspect of the present disclosure, the timing circuit may be configured to set the diagnosis timing such that the diagnosis timing is within an idling time zone in which an output of backup power from the power conversion unit to the load is stopped. The health diagnosis circuit is configured to diagnose the health of the power conversion unit at the diagnosis timing.

The backup power supply mentioned above has an advantage in which, even in a standby state in which the backup power supply is not operated, health of the power conversion unit is diagnosed. When the backup power supply is operated, electric power can be supplied to a load securely. This is because health of the power conversion unit can be diagnosed even at the timing when no electric power is supplied to a load. In an emergency, i.e., when a main power source is shut down or the like, the backup power supply turns into an operating state and supplies electric power to a load. Accordingly, in almost all time zones, the backup power supply is in an idling state, i.e., does not supply electric power to a load. Even in an idling time zone, health of the power conversion unit is diagnosed. Therefore, when detecting a malfunction, the power conversion unit of the above-mentioned backup power supply can be replaced with new one that operates normally. Consequently, the operating state is maintained securely over a long period of time, thereby allowing electric power to be supplied securely to a load in an emergency such as a power failure, thus providing high reliability.

In the backup power supply in accordance with still another aspect of the present disclosure, the timing circuit may be configured to set a plurality of diagnosis timings at predetermined time intervals within the idling time zone, the plurality of diagnosis timings including the diagnosis timing. The health diagnosis circuit may be configured to diagnose the health of the power conversion unit at the plurality of diagnosis timings.

The backup power supply mentioned above supplies electric power to a load only when being in an emergency such as a power failure. In such a backup power supply, a proportion of the idling time zone to the entire time zone is extremely long. In the idling time zone, no electric power is supplied to a load. The backup power supply diagnoses health of the power conversion unit repeatedly in a long idling time zone. Thus, the backup power supply provides an advantage that a normal operating state of the power conversion unit is maintained in the long idling time zone and, in an emergency, electric power can be supplied to a load securely. This is because a broken power conversion unit can be replaced in the idling time zone to maintain the normal operating state continuously. Especially, the backup power supply diagnoses health of the power conversion unit repeatedly in the idling time zone. Thus, the backup power supply has an advantage that, even if the power conversion unit breaks down in the idling time zone, failure time can be minimized and the broken power conversion unit can immediately be replaced by a normal power conversion unit.

In the backup power supply in accordance with still another aspect of the present disclosure, the power conversion unit may be configured to adjust a voltage of output power to a predetermined value and out put the output power to the load. The health diagnosis circuit may be configured to diagnose the health of the power conversion unit and the battery module.

In the backup power supply in accordance with still another aspect of the present disclosure, the health diagnosis circuit may be configured to diagnose both the health of the power conversion unit and degradation of the battery module at the diagnosis timing.

In the backup power supply in accordance with still another aspect of the present disclosure, the determination circuit may be configured to calculate a power conversion efficiency based on a ratio of the output power output to the load from the power conversion unit to the input power of the power conversion unit. The determination circuit may be configured to diagnose the health of the power conversion unit by comparing the power conversion efficiency with the threshold.

In the backup power supply in accordance with still another aspect of the present disclosure, the health diagnosis circuit may further include a first temperature detector configured to detect temperature of the power conversion unit. The determination circuit may use, together with the ratio, the temperature detected by the first temperature detector as a parameter for diagnosing the health.

In the backup power supply in accordance with still another aspect of the present disclosure, the health diagnosis circuit may further include a second temperature detector configured to detect temperature of the battery module. The determination circuit may use, together with the ratio, the temperature detected by the second temperature detector as a parameter for diagnosing the health.

In the backup power supply in accordance with still another aspect of the present disclosure, the power conversion unit may include a DC-DC converter or a DC-AC converter configured to adjust output voltage of the battery module and output the adjusted voltage to the load.

In the backup power supply in accordance with still another aspect of the present disclosure, the health diagnosis circuit may be configured to adjust output voltage and output current of the power conversion unit and output the adjusted output voltage and the adjusted output current.

In the backup power supply in accordance with still another aspect of the present disclosure, the power conversion unit may further include a stabilization circuit configured to stabilize output. The stabilization circuit may be configured to stabilize the output voltage and output current of the power conversion unit and adjust output power to a predetermined value output to the load.

The present disclosure will be detailed below with reference to drawings. Although the following description uses terms (e.g., "above," "below," and another term including those terms) that indicate a specific direction and position as necessary, those terms are used for ease of understanding the invention with reference to the drawings, but the technical scope of the present invention is not limited by meaning of those terms. Further, like reference signs, which appear in the plurality of drawings, indicate like or equivalent portions or members.

Exemplary embodiments described below show specific examples of the technical thought of the present invention, and does not limit the present invention to below. Further, dimensions, materials, and shapes of the components described below, a relative arrangement therebetween, and the like intend not to limit but to illustrate the scope of the present invention, unless otherwise noted. Still further, the contents described in one exemplary embodiment or one example are also applicable to the other exemplary embodiment or the other example. Further, sizes of members shown in the drawing, a positional relationship therebetween, or the like may be exaggerated to clarify the description.

Exemplary Embodiment 1

Figure 1:
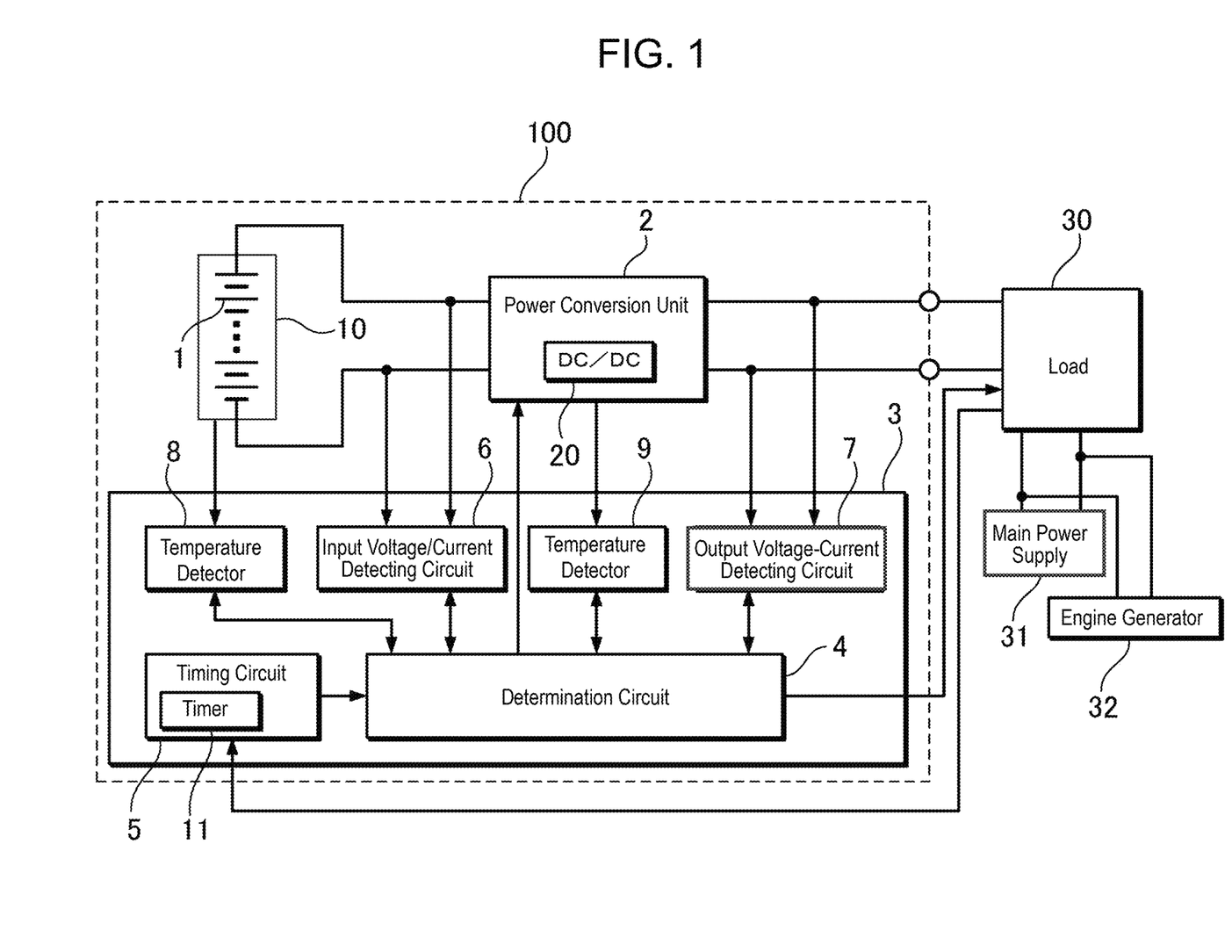
FIG. 1 is a circuit diagram of a backup power supply in accordance with an exemplary embodiment of the present disclosure.

Backup power supply 100 shown in FIG. 1 includes: battery module 10 including battery cells 1, power conversion unit 2 in which a direct-current (DC) output of battery module 10 is adjusted to a voltage to be supplied to load 30; and health diagnosis circuit 3 for power conversion unit 2. Backup power supply 100 is connected to load 30, such as a server, and used for supplying electric power to load 30 and holding load 30 in an operating state in the state where no electric power is supplied to load 30 from main power source 31 in a power failure. A period of time when backup power supply 100 maintains the operating state of load 30, such as a server, in a power failure is longer than a period of time when engine generator 32 is started or a server is terminated normally.

Battery Module 10

Battery module 10 includes battery cells 1 connected in series and parallel to one another. In battery module 10, output voltage is adjusted by the number of battery cells 1 connected in series to one another, and output current or the entire charge/discharge capacity is adjusted by the number of battery cells 1 connected in parallel to one another. The capacity of battery module 10 is determined to allow electric power to be supplied so as to operate load 30 continuously for several minutes. A rechargeable lithium-ion battery may be used as battery cell 1. While the rechargeable lithium-ion battery increases charge/discharge capacity, the battery cell 1 of the present disclosure is not limited to this. All the other rechargeable batteries, such as a solid-state battery, can be used.

Power Conversion Unit 2

Figure 2:
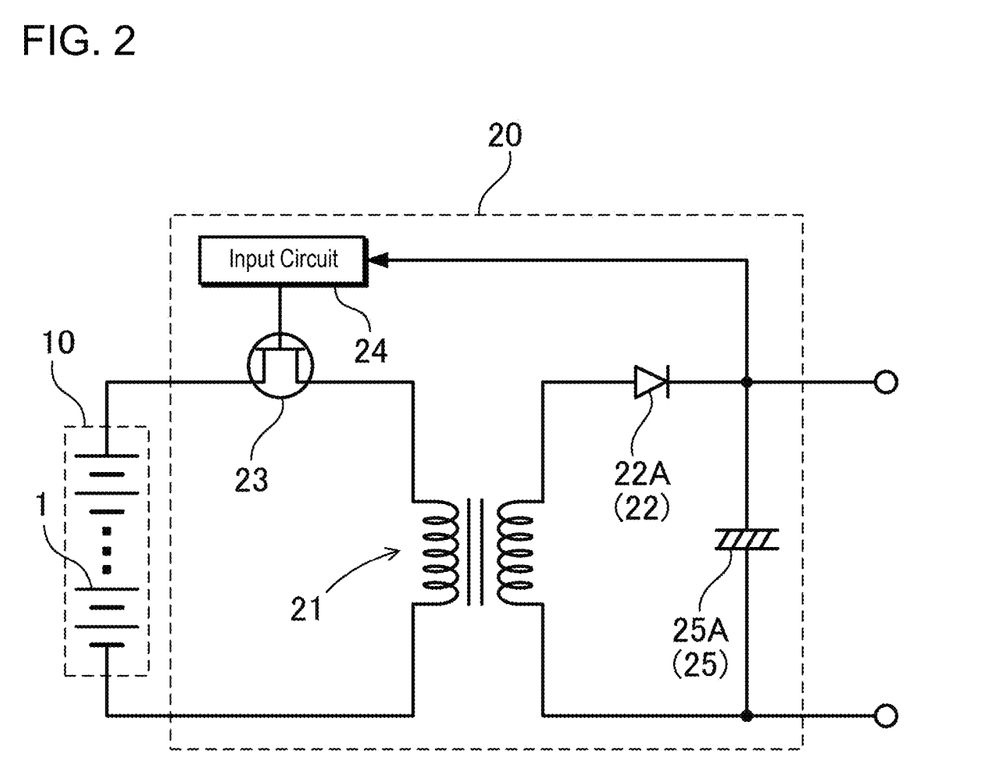
FIG. 2 is a schematic circuit diagram of a DC-DC converter showing an operation thereof.

Power conversion unit 2 includes DC-DC converter 20 configured to adjust a voltage of battery module 10 to a voltage to be supplied to load 30 and output the adjusted voltage. FIG. 2 is a schematic circuit diagram of DC-DC converter 20 for showing an operating principle thereof. In DC-DC converter 20 of this circuit diagram, direct current input from battery module 10 is switched and converted into alternating current. Subsequently, the alternating current is subjected to voltage adjustment in transformer 21 and then, the alternating current output from transformer 21 is converted into direct current by rectifier circuit 22 and output. This circuit diagram shows the minimum components that indicate an operating principle of DC-DC converter 20, but actual DC-DC converter 20 further includes other components. DC-DC converter 20 of the circuit diagram in FIG. 2 includes: semiconductor switching element 23 configured to convert direct current input from battery module 10 into alternating current, input circuit 24 configured to control turning on and off of semiconductor switching element 23; transformer 21 with a primary side connected to semiconductor switching element 23; diode 22A connected to a secondary side of transformer 21 and constitutes rectifier circuit 22 configured to convert the output alternating current into direct current, and electrolytic capacitor 25A constituting smoothing circuit 25 configured to smooth pulsating current output from diode 22A. The DC-DC converter of the present disclosure is isolated through transformer 21. The DC-DC converter is not specified to this. All the other DC-DC converters, such as a non-isolated type, can be used.

DC-DC converter 20 mentioned above constitutes a stabilization circuit in which input circuit 24 controls a duty of semiconductor switching element 23 based on output voltage, and adjusts the output voltage to a fixed voltage. Thus, DC-DC converter 20 mentioned above constitutes a stabilization circuit configured to maintain the output voltage constant even if a voltage input from battery module 10 changes. Furthermore, although not shown, power conversion unit 2 includes a current stabilization circuit configured to cause output current flowing on an output side of DC-DC converter 20 to be constant so as to stabilize both the output voltage and the output current, so that output power supplied to load 30 can be controlled to a predetermined value. A DC-AC converter may be employed as power conversion unit 2. Power conversion unit 2 may include a cooling mechanism configured to forcibly cool heat-generating elements, such as a semiconductor switching element and a diode, to prevent disadvantages cause by heat generation. However, degradation and failure of these components are also likely to affect the power conversion efficiency.

Health Diagnosis Circuit 3

Health diagnosis circuit 3 is configured to detect a power conversion efficiency of power conversion unit 2 so as to diagnose health (soundness). Health diagnosis is performed such that input power and output power of power conversion unit 2 are detected so as to diagnose health of power conversion unit 2 based on the input power and the output power. In a normal operation state, power conversion unit 2 converts input power at a high power conversion efficiency, and outputs the converted input power. However, if some components break down or the like, the power conversion efficiency decreases, so that the output power is reduced with respect to the input power. Health diagnosis circuit 3 is configured to diagnose health of power conversion unit 2 by calculating a power conversion efficiency, i.e., a ratio of the output power to the input power and comparing the calculated power conversion efficiency with a threshold.

In order to detect input power and output power of power conversion unit 2, health diagnosis circuit 3 of backup power supply 100 shown in FIG. 1 includes input voltage-current detection circuit 6 configured to detect a DC voltage and a DC current supplied to power conversion unit 2 from battery module 10, and output voltage-current detection circuit 7 configured to detect a DC voltage and a DC current output to load 30 from power conversion unit 2. Health diagnosis circuit 3 further includes temperature detector 8 for a battery configured to detect temperature of battery module 10, temperature detector 9 configured to detect temperature of power conversion unit 2, determination circuit 4 configured to diagnose health of power conversion unit 2, and timing circuit 5 configured to determine a timing at which the health is diagnosed.

Temperature Detectors 8 and 9

Temperature detector 8 for a battery is configured to detect temperature of battery modules 10 to obtain the maximum temperature or mean temperature, or detect temperature near battery cell 1 having temperature increasing. Temperature detector 8 includes a temperature sensor and a temperature detection circuit configured to convert the detected temperature obtained through a signal from the temperature sensor into a temperature signal and output the converted signal. Temperature detector 9 configured to detect temperature of power conversion unit 2 is configured to detect, by using the temperature sensor, temperature of heat generating components constituting power conversion unit 2 and a radiator coupling the heat generating components thermally to one another, and converts the temperature into a temperature signal by the temperature detection circuit.

Determination Circuit 4

Determination circuit 4 is configured to diagnose health of power conversion unit 2 at a diagnosis timing determined by timing circuit 5. At a diagnosis timing of power conversion unit 2, timing circuit 5 output, to determination circuit 4, a diagnosis signal which starts health diagnosis.

At the diagnosis timing, determination circuit 4 turns power conversion unit 2 into an operating state and supplies electric power to load 30 from battery module 10 in response to the diagnosis signal input from timing circuit 5. Determination circuit 4 calculates input power based on the input voltage and the input current of power conversion unit 2 which are input from input voltage-current detection circuit 6.

Furthermore, determination circuit 4 calculates output power based on the output voltage and the output current of power conversion unit 2 which are input from output voltage-current detection circuit 7, and diagnoses health of power conversion unit 2 based on the input power and the output power. Determination circuit 4 diagnoses health of power conversion unit 2 based on the input power and the output power as follows. However, a method of health diagnosis is not specified to the following manner. The present disclosure may employ all methods that can diagnose the health from an input and an output.

Determination circuit 4 may calculate a power conversion efficiency of power conversion unit 2 based on the input power and the output power, compare the calculated power conversion efficiency with a threshold, and diagnose, as a malfunction, the state where the power conversion efficiency is lower than the threshold. Furthermore, if the output power of power conversion unit 2 is adjusted to a fixed value and supplied to load 30, health diagnosis circuit 3 may compare only the input power with a threshold and diagnose, as a malfunction, the state where the input power is larger than the threshold without detecting the output power. Still further, if output voltage of power conversion unit 2 is adjusted to a fixed voltage and supplied to load 30, determination circuit 4 may detect output current and the input power to diagnose the health without detecting the output voltage. Determination circuit 4 thus calculates output power based on the above-mentioned voltage, which is stabilized and output, and the detected output current. Determination circuit 4 may calculate a power conversion efficiency based on the output power and the input power to diagnose health of power conversion unit 2. Further, if output current of power conversion unit 2 is adjusted to a fixed current and supplied to load 30, determination circuit 4 may also detect output voltage and the input power to diagnose the health without detecting the output current. Determination circuit 4 mentioned above also calculates output power based on the detected output voltage and the above-mentioned current which is stabilized and output. Thus, determination circuit 4 is configured to calculate the power conversion efficiency based on this output power and the input power to diagnose health of power conversion unit 2.

Furthermore, determination circuit 4 may also compares a changing rate of the power conversion efficiency with a threshold to diagnose health of power conversion unit 2. When the power conversion efficiency decreases rapidly and a changing rate of the falling is larger than a threshold, determination circuit 4, mentioned above, diagnoses that health of power conversion unit 2 cannot be guaranteed. Although diagnosing health of power conversion unit 2 based on the input power and the output power, determination circuit 4, mentioned above, may employ temperature of the power conversion circuit as a parameter for health diagnosis, together with the above-mentioned ratio, in addition to the input power and the output power. Thus, determination circuit 4 may diagnose the health more accurately. Determination circuit 4 mentioned above may correct a threshold, which specifies health diagnosis from input power and output power, by using the temperature, or may diagnose that, when the temperature exceeds the threshold, the health of power conversion unit 2 cannot be guaranteed.

Furthermore, in addition to health diagnosis of power conversion unit 2, determination circuit 4 of health diagnosis circuit 3 may also diagnose a degree of degradation in battery module 10 at the diagnosis timing. The degree of degradation in battery module 10 may be determined such that, at a diagnosis timing when no electric power is supplied to load 30, battery module 10 is discharged to supply electric power to load 30 from battery module 10 and a changing rate of the remaining capacity, which caused by the discharging, is calculated. Specifically, discharge current, output voltage, and temperature of battery module 10 are measured at a predetermined sampling cycle in the state where fixed electric power is supplied to load 30 from battery module 10, and the remaining capacity is calculated from discharge capacity. In consideration of temperature dependency, a degree of degradation is determined from a change amount of the remaining capacity. A change in the remaining capacity with respect to the discharge capacity increases as battery module 10 deteriorates. Therefore, the degree of degradation may be determined based on a changing rate of the remaining capacity. Backup power supply 100, mentioned above, may also determine a degree of degradation in battery module 10 simultaneously while diagnosing health of power conversion unit 2.

Timing Circuit 5

Timing circuit 5 is configured to determine a diagnosis timing of power conversion unit 2. Timing circuit 5 outputs a diagnosis signal to determination circuit 4 at the diagnosis timing. Backup power supply 100 does not supply electric power to load 30 in an idling state. For instance, in the case where a commercial power source is shut down due to a power failure, backup power supply 100 supplies electric power to load 30 temporarily in order to maintain load 30, which can hardly receive operating power from main power source 3, in an operating state. Backup power supply 100 does not activate power conversion unit 2 in the idling state, i.e., when operating power is supplied to load 30 from main power source 31 normally. Timing circuit 5 determines a diagnosis timing in an idling time zone, and backup power supply 100 diagnoses health of power conversion unit 2 at that timing. Within the idling time zone, an output of backup power from power conversion unit 2 to load 30 is stopped. Timing circuit 5 may also set a diagnosis timing such that the diagnosis timing is included within the time zone in which electric power is supplied to load 30, and health of power conversion unit 2 may be diagnosed at that timing.

Timing circuit 5 may use a trigger signal which is input from load 30 located outside backup power supply 100 in order to determine the diagnosis timing, or may use timer 11 mounted therein to determine the diagnosis timing. Timing circuit 5 repeats diagnosis timings every time when a predetermined time elapses, or preferably at fixed intervals. Thus, health of power conversion unit 2 is diagnosed at diagnosis timings. If the interval of diagnosis timings is small, health of power conversion unit 2 may be detected more frequently, but battery module 10 is discharged at the diagnosis timing. Therefore, the intervals of diagnosis timings are set to an optimum value in consideration of a decrease in the remaining capacity, which is caused by a discharge of battery module 10, and a timing at which health of power conversion unit 2 may be detected.

Backup power supply 100 mentioned above diagnoses health of power conversion unit 2 in the following processes. Furthermore, at the timing when health of power conversion unit 2 is diagnosed, a degree of degradation in battery module 10 is also determined.

Idling Time Zone

Since electric power is supplied to load 30 in an emergency, backup power supply 100 is in an idling state in a normal state. In the idling state, health diagnosis circuit 3 is also controlled to be in an idling state. Health diagnosis circuit 3 in the idling state activates timing circuit 5 such that timing circuit 5 may determine a diagnosis timing, and holds the other circuits so as not to operate.

In an idling time zone, timing circuit 5 detects a trigger signal input from load 30, or uses timer 11 mounted therein to determine a diagnosis timing of power conversion unit 2. At the diagnosis timing, timing circuit 5 outputs a diagnosis signal. When the diagnosis signal is output from timing circuit 5, health diagnosis circuit 3 activates all the circuits.

Diagnosis Timing

The diagnosis signal is input to determination circuit 4, and power conversion unit 2 is activated. Then, power conversion unit 2 converts a voltage of an input direct current, and stabilizes the voltage to a fixed value and output the stabilized voltage to load 30. In the state where electric power is supplied to load 30 from power conversion unit 2, input voltage-current detection circuit 6 detects voltage and current that are supplied to power conversion unit 2 from battery module 10, i.e., inputs voltage and input current of power conversion unit 2 at predetermined sampling intervals and outputs the detected voltage and current to determination circuit 4. Furthermore, output voltage-current detection circuit 7 detects voltage and current that are supplied to load 30 from power conversion unit 2, i.e., output voltage and output current of power conversion unit 2 at predetermined sampling intervals and outputs the detected voltage and current to determination circuit 4. Still further, temperature detectors 8 and 9 detect temperature of battery module 10 and temperature of power conversion unit 2, respectively, at predetermined sampling intervals and output the detected temperatures to determination circuit 4.

Determination circuit 4 calculates input power based on from the input voltage and the input current, which are input at the predetermined sampling intervals, and further calculates output power based on the output voltage and the output current, so that a power conversion efficiency of power conversion unit 2 is calculated as a ratio of the input power to the output power. In determination circuit 4, the power conversion efficiency is detected at the predetermined sampling intervals and compared with a threshold to determine the health. In determination circuit 4, power conversion efficiency (En) detected at fixed sampling intervals is compared with initial power conversion efficiency (E0). When ratio (En/E0) of power conversion efficiency (En) to initial power conversion efficiency exceeds a threshold previously set, determination circuit 4 determines that the health is good. For instance, when ratio (En/E0) is lower than the threshold previously set, determination circuit 4 determines that the health is not good. Without comparing power conversion efficiency (En) with initial power conversion efficiency (E0), determination circuit 4 may also compare power conversion efficiency (En) with a threshold previously set, to determine health failure. For instance, when power conversion efficiency (En) is lower than the threshold previously set, determination circuit 4 may determine that the health is not good. When ratio (En/E0) exceeds the threshold plural times, or when power conversion efficiency (En) exceeds the threshold plural more times, determination circuit 4 may determine that the health is not good, so that the determination may be performed more accurately.

Furthermore, when a decreasing rate of ratio (En/E0) of power conversion efficiency exceeds a threshold, or when a decreasing rate of each power conversion efficiency (En) exceeds a threshold without comparing each power conversion efficiency (En) with initial power conversion efficiency (E0), determination circuit 4 may determine that the health is not good. Still further, when the decreasing rate of ratio (En/E0) of power conversion efficiency exceeds the threshold plural times, or when the decreasing rate of power conversion efficiency (En) exceeds the threshold plural times, determination circuit 4 mentioned above may determine that the health is not good.

Furthermore, power conversion efficiency (En) of power conversion unit 2 varies depending on temperature. For instance, a decrease in power conversion efficiency (En) may be caused by a temperature rise of a semiconductor switching element. Therefore, the threshold which is used to determine the health is corrected by the temperature, and the health of power conversion unit 2 may be determined more correctly. Determination circuit 4 mentioned above uses the detected temperature of battery module 10 and the detected temperature of power conversion unit 2 as parameters for diagnosing the health of power conversion unit 2 together with the above-mentioned ratio. The detected temperature of battery module 10 is detected by temperature detector 8 for a battery, and the detected temperature of power conversion unit 2 is detected by temperature detector 9.

Furthermore, health diagnosis circuit 3 may store, in a memory, the detected values which are detected at the predetermined sampling intervals by input voltage-current detection circuit 6 and output voltage-current detection circuit 7 or temperature detectors 8 and 9. In determination circuit 4, the data stored in the memory may be subjected to arithmetic processing to determine the health of power conversion unit 2.

Furthermore, at the diagnosis timing, determination circuit 4 calculates a discharge capacity and the remaining capacity of battery module 10 based on the detected data which are detected at the predetermined sampling intervals by input voltage-current detection circuit 6 and output voltage-current detection circuit 7 or temperature detectors 8 and 9 in the state where electric power is supplied to load 30 from power conversion unit 2. Thus, a degree of degradation in battery module 10 may also be determined. A decrease in the remaining capacity with respect to the discharge capacity increases as a degree of degradation in battery module 10 increases. Therefore, determination circuit 4 may calculate a decrease in the remaining capacity with respect to the discharge capacity to determine a degree of degradation in battery module 10.

When determining that the health of power conversion unit 2 is not good, health diagnosis circuit 3 outputs a health failure signal to the outside and displays it, or outputs the signal to load 30 and displays it. Further, when a degree of degradation in battery module 10 is decreased to a predetermined value, health diagnosis circuit 3 outputs a signal configured to indicate a degradation in battery module 10 to the outside and displays it, or outputs the signal to load 30 and displays it.

A maintenance staff for backup power supply 100 checks a display of health failure and replaces backup power supply 100, or replaces only power conversion unit 2 in an idling state of backup power supply 100. Alternatively, the maintenance staff checks the display configured to indicate a degradation in battery module 10 and replaces only battery module 10. Thus, backup power supply 100 may be maintained continuously in a healthy state.

INDUSTRIAL APPLICABILITY

A backup power supply according to the present disclosure is a backup power supply configured to supply electric power to a load in an emergency such as a power failure. Especially, the backup power supply is suitably applicable to a power supply provided with a power conversion unit in which output voltage of a battery module is adjusted and supplied to a load.

REFERENCE MARKS IN DRAWINGS

100 backup power supply
1 battery cell
2 power conversion unit
3 diagnosis circuit
4 determination circuit
5 timing circuit
6 input voltage-current detection circuit
7 output voltage-current detection circuit
8 temperature detector
9 temperature detector
10 battery module
11 timer
20 DC-DC converter
21 transformer
22 rectifier circuit
22A diode
23 semiconductor switching element
24 input circuit
25 smoothing circuit
25A electrolytic capacitor
30 load
31 main power source
32 engine generator

The invention claimed is:

1. A backup power supply comprising:
a battery module including battery cells;
a power conversion unit configured to adjust a voltage of an output of the battery module and output the adjusted output to a load; and
a health diagnosis circuit for the power conversion unit, wherein
the health diagnosis circuit includes a determination circuit configure to diagnose health of the power conversion unit by detecting input power and output power of the power conversion unit and comparing a ratio of the output power to the input power with a threshold.

2. The backup power supply according to claim 1, wherein
the health diagnosis circuit further includes a timing circuit configured to determine a diagnosis timing of the power conversion unit, and
the determination circuit is configured to diagnose the health of the power conversion unit by controlling the power conversion unit to output electric power to the load at the diagnosis timing determined by the timing circuit.

3. The backup power supply according to claim 2, wherein the timing circuit is configured to determine the diagnosis timing in response to a trigger signal input from an outside of the backup power supply.

4. The backup power supply according to claim 2, wherein the timing circuit includes a timer configured to determine the diagnosis timing.

5. The backup power supply according to claim 2, wherein
the timing circuit is configured to set the diagnosis timing such that the diagnosis timing is within an idling time zone in which an output of backup power from the power conversion unit to the load is stopped, and the health diagnosis circuit is configured to diagnose the health of the power conversion unit at the diagnosis timing.

6. The backup power supply according to claim 5, wherein
the timing circuit is configured to set a plurality of diagnosis timings at predetermined time intervals within the idling time zone, the plurality of diagnosis timings including the diagnosis timing, and
the health diagnosis circuit is configured to diagnose the health of the power conversion unit at the plurality of diagnosis timings.

7. The backup power supply according to claim 2, wherein, at the diagnosis timing,
the power conversion unit is configured to adjust a voltage of output power to a predetermined value and out put the output power to the load, and
the health diagnosis circuit is configured to diagnose the health of the power conversion unit and the battery module.

8. The backup power supply according to claim 2, wherein the health diagnosis circuit is configured to diagnose both the health of the power conversion unit and degradation of the battery module at the diagnosis timing.

9. The backup power supply according to claim 1, wherein
the determination circuit is configured to calculate a power conversion efficiency based on a ratio of the output power output to the load from the power conversion unit to the input power of the power conversion unit, and
the determination circuit is configured to diagnose the health of the power conversion unit by comparing the power conversion efficiency with the threshold.

10. The backup power supply according to claim 1, wherein
the health diagnosis circuit further includes a first temperature detector configured to detect temperature of the power conversion unit, and
the determination circuit uses, together with the ratio, the temperature detected by the first temperature detector as a parameter for diagnosing the health.

11. The backup power supply according to claim 1, wherein
the health diagnosis circuit further includes a second temperature detector configured to detect temperature of the battery module, and
the determination circuit uses, together with the ratio, the temperature detected by the second temperature detector as a parameter for diagnosing the health.

12. The backup power supply according to claim 1, wherein the power conversion unit comprises a DC-DC converter or a DC-AC converter configured to adjust output voltage of the battery module and output the adjusted voltage to the load.

13. The backup power supply according to claim 1, wherein the health diagnosis circuit is configured to adjust output voltage and output current of the power conversion unit and output the adjusted output voltage and the adjusted output current.

14. The backup power supply according to claim 1, wherein
the power conversion unit further includes a stabilization circuit configured to stabilize output, and
the stabilization circuit is configured to stabilize the output voltage and output current of the power conversion unit and adjust output power to a predetermined value output to the load.

* * * * *